US00RE37733E

(19) United States
(12) Reissued Patent
Ter-Stepanian

(10) Patent Number: US RE37,733 E
(45) Date of Reissued Patent: Jun. 11, 2002

(54) METHOD FOR SETTLING OF SUSPENSIONS WITH USE OF SEEPAGE FORCE AND VIBRATIONS

(76) Inventor: George Ter-Stepanian, 4 Sanford Dr., Shelton, CT (US) 06484

(21) Appl. No.: 09/686,195

(22) Filed: Oct. 10, 2000

Related U.S. Patent Documents

Reissue of:
(64) Patent No.: 5,997,753
Issued: Dec. 7, 1999
Appl. No.: 09/239,220
Filed: Jan. 28, 1999

U.S. Applications:
(63) Continuation-in-part of application No. 08/833,328, filed on Apr. 4, 1997, now abandoned.

(51) Int. Cl.[7] ..... C02F 11/12
(52) U.S. Cl. ..... 210/767; 210/780
(58) Field of Search ..... 210/513, 519, 210/767, 800

(56) References Cited

U.S. PATENT DOCUMENTS 4,194,976 A * 3/1980 Robinsky ..... 210/521
4,295,973 A * 10/1981 Jain ..... 210/738
5,433,862 A * 7/1995 Batson ..... 210/521
5,549,827 A * 8/1996 Batson ..... 210/521
5,814,230 A * 9/1998 Willis et al. ..... 210/783

* cited by examiner

*Primary Examiner*—David A. Simmons
*Assistant Examiner*—Betsey Morrison Hoey

(57) ABSTRACT

The inability to settle mining tailings, pumps, slurries, and other wastes in form of hard sediments and forced storage of jelly-like sludge in tailings ponds have a great economic and environmental impact. This feature is caused by suspension force arising due to high neutral pressure. The drag caused by friction between sinking solid particles and immovable water generates the upward directed suspension force that decreases the unit weight of solid particles, and they settle extremely slowly. On sufficient concentration of solid particles they become weightless and further settling is ceased. The solid particles remain suspended for a long time. The suspension force can be destroyed by greater oppositely directed seepage force. For this purpose the suspension is supplied into a container with permeable member, low pressure acting on its downstream surface is ensured, and passage of liquid through the permeable member is initiated. A downward directed seepage force is formed in the permeable member. A rather rapid settling of solid particles occurs, and dense sediment is obtained. A number of auxiliary methods can be used, such as vibration for destroying loose structure formed by rigid angular grains, diluting of thick suspensions for initiating seepage, vacuuming for increasing the hydraulic gradient in open containers, applying supplementary hydrostatic pressure above the permeable member for increasing the hydraulic gradient in closed containers, and using conveyors for continuous processing. The method can be used for purification of liquids by settling the impurities.

9 Claims, 3 Drawing Sheets

M
F
C
A
E
P
K
Q
L
O
R
U
T
B
D
G
N
N'
G'
V
V'
c
h1
h2
h3
h4
h5
H
i
ic
1
2
3
4
5
6
7
8
9
10
11
12
13
14
15
16
17
18
19
20
21
22
23
24
25
26
27
28
29
30
31
35

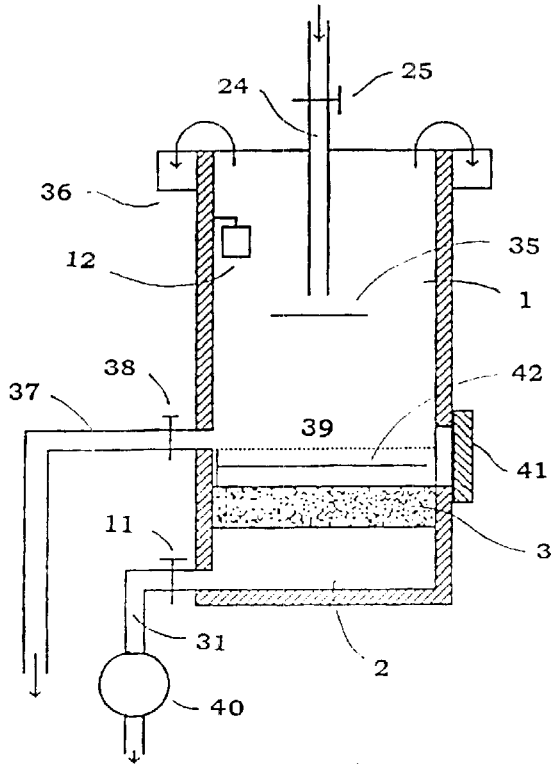
Fig. 3
Fig. 4
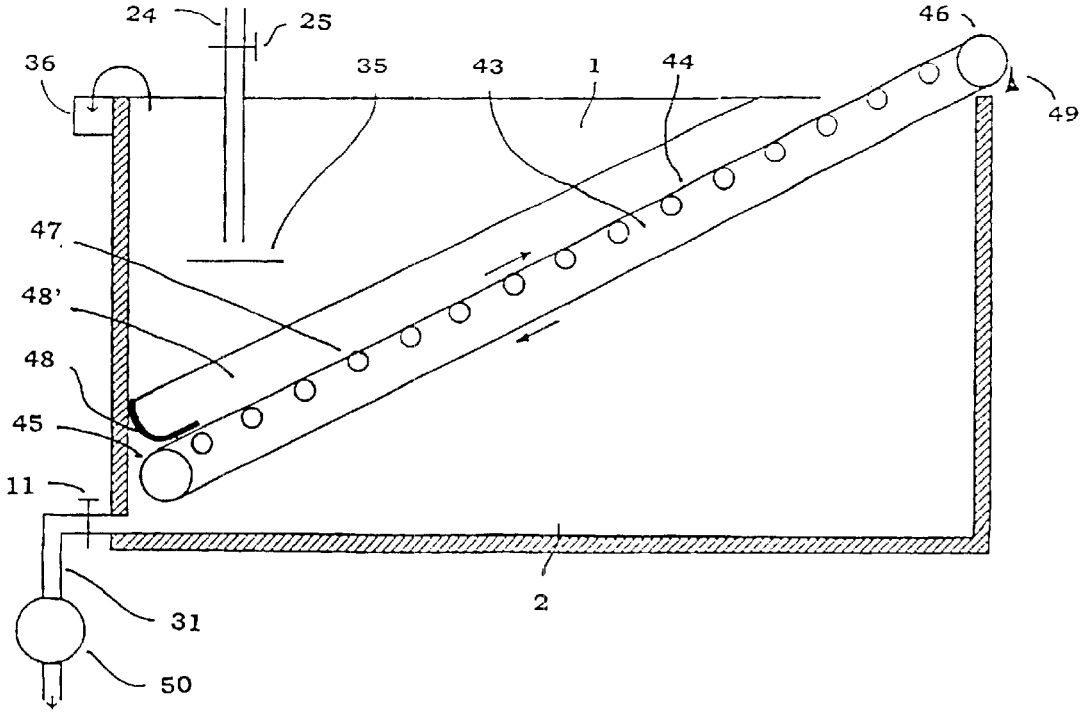

METHOD FOR SETTLING OF SUSPENSIONS WITH USE OF SEEPAGE FORCE AND VIBRATIONS

Matter enclosed in heavy brackets [ ] appears in the original patent but forms no part of this reissue specification; matter printed in italics indicates the additions made by reissue.

This is a continuation in part application Ser. No. 08/833,328 filed Apr. 4,1997 and now abandoned.

STATEMENT REGARDING FEDERALLY SPONSORED RESEARCH OR DEVELOPMENT

Not applicable

BACKGROUND OF THE INVENTION

The present invention relates to settling of thick suspensions.

Suspensions are formed in many types of technology, usually as industrial wastes. Among suspensions are tailings, pulps, refuse, and contaminated earth. Tailings are the most important [Types] *types* of wastes from both economical and ecological standpoints.

For better extraction of ores the rocks are ground to silt-and clay-size fraction. After ore benefaction the tailings are transported to tailings ponds for storage. The solid concentration in the initial slurry is different. The slurry discharged from the mill contains usually from 15 to 55% of solids.

The suspension in tailings ponds settles with decelerating rate. The mass is separated into supernatant and rather dense slurry containing higher concentration of solids.

Following the initial period of settling, the process becomes extremely slow. An idea of the duration of the process may be gained from the distribution of unit weights of sludge in tailings ponds. The following data refer to a disposal of tar sand tailings. The accumulation of tailings began in 1966; the measurements were made in 1977.

| | | | | |
|---|---|---|---|---|
| Depth din meters | 6.1 | 13.7 | 18.3 | 21.3 |
| Unit weight $\gamma_m$ in tons per $m^3$ | 1.20 | 1.31 | 1.38 | 1.44 |

Relationship between d and $\gamma_m$ is linear. That testifies to continuing of settling, because a definite value of unit weight in the whole mass corresponds to the critical state. Condensation of tailings after 11 years of settling is far of the end. The tailings of the pond are in the subcritical state (see below).

The time of total settling of solids to a compact deposit that can support load is unknown. It is supposed that the time of total settling is varying anywhere between 100 and 1000 years. This time period is too long to be checked.

Mine tailings represent the largest tonnage of industrial waste produced. Billions of tons off wastes are produced annually. Unused tailings are stored in tailings ponds. The area and volume of tailings ponds increase everywhere. Tailings ponds occupy the floor of valleys. Valuable material goes to waste. Tailings ponds and contaminated earth represent a serious and major environmental problem. The visual effect of the landscape of tailings disposal is despondent. However the major ecological effect is the surface and ground water pollution. The contaminated water contains heavy metals, mill reagents, sulfur compounds, etc. Uranium tailings are a serious source of radioactive contamination.

Tailings ponds collect all precipitation falling in basins upstream of tailings dams. The fresh rain and melted snow water is mixed with the polluted technological water of tailings and gets contaminated too. Its ecological effect cannot be overestimated.

Tailings ponds may cause major disasters on bursting of tailings dams. The bursting of tailings dams is not infrequent. During last decades such failures occurred at El Cobre Dam, Chile in 1965, coal waste pile in Aberfan, Wales, England in 1966. Mulfalire mine in Africa in 1970, coal refuses at Buffalo Creek, West Virginia in 1972, Mochikoshi Dam, Japan in 1978, etc.

Twenty years ago Fitch wrote: "There exist no models, theories, or design procedures, which could be accepted as well proven at the present time. We hope that we are making progress, but those applying existing theories or procedures for practical design should accept none as gospel." Very little has been changed during time elapsed.

BRIEF SUMMARY OF THE INVENTION

It is the object of this invention to provide an effective and inexpensive method for settling of suspensions.

Suspensions containing liquid and solid constituents settle only partly. They form a viscous or jelly-like mass that does not settle completely itself with time. They can be dehydrated artificially only by use of chemicals or by drying. The reason why suspensions do not settle remained unidentified up to present.

The invention provides an unobvious method of processing that satisfies the long-existing requirements of industry. The industry incurs immense material losses measured annually by billions of dollars. The environment suffers from great impact. In spite of these facts the problem remains unsolved for more than a century.

The situation was so hopeless that the problem was considered officially as an unsolvable one. According to the definition, a suspension is a "liquid carrying throughout its volume in extremely fine subdivision an insoluble substance (solid or another liquid) which will not settle under gravity nor can be filtered without special treatment such as addition of chemical agents" (U.S. Patent and Trademark Office, U.S. Patent Classification Definitions. Class 210—Liquid Purification or Separation. June 1955, page 210-5).

Such behavior of suspensions is a result of action of the suspension force. This force is generated by friction between immovable water and sinking solid particles. This force had been discovered, and its properties were investigated by the inventor. That made it possible to propose the present method of settling without any addition of chemicals, or other special treatment.

An effective method of settling of tailings and the like is of great importance. It will permit the recovery and use of the mineral resources contained in waste, and accumulated in tailings ponds. An incredible quantity of these mineral resources is lost: one third of phosphate mined in Florida, one half of tin mined in Bolivia and one fifth of the world's tungsten. Settling of tailings has a number of advantages. The tailings after settling can be used as building and road materials. Valuable land occupied by tailings ponds can be returned to the national economy. Water and soluble chemical reagents used in technological process will be recycled. The demand for fresh water will be kept to a minimum. Finally the threat of disasters on bursting of tailings dams can be removed.

Settling of tailings can be made directly in concentration mills. Major expenses for transportation of tailings, their thickening, construction of tailings dams, management of tailings ponds, protection of groundwater from contamination will be saved. Tailings from a major debit item turn into a major credit item.

The method can be used also for purification of liquids from impurities.

DETAILED DESCRIPTION OF THE DRAWINGS

FIG. 1 is a schematic illustration of an apparatus and a diagram demonstrating the hydraulic gradients acting within suspensions. The apparatus is shown on the left, and the diagram on the right. The origin O of co-ordinates of the diagram is at the upper surface of the permeable member 3. Heights are shown on the vertical axis of the drawing, and piezometric heads on the horizontal one. Angles are denoted by their tangents.

FIG. 3 shows settling of suspension in an open container with periodical removal of sediments to be used when an intermediate seepage force is required; vibrating and vacuuming of the suspension are added.

FIG. 4 shows settling of suspension in an open container with continuous removal of sediments to be used when a low seepage force is required; conveyor is added.

DETAILED DESCRIPTION OF THE INVENTION

Figures 1, 2:
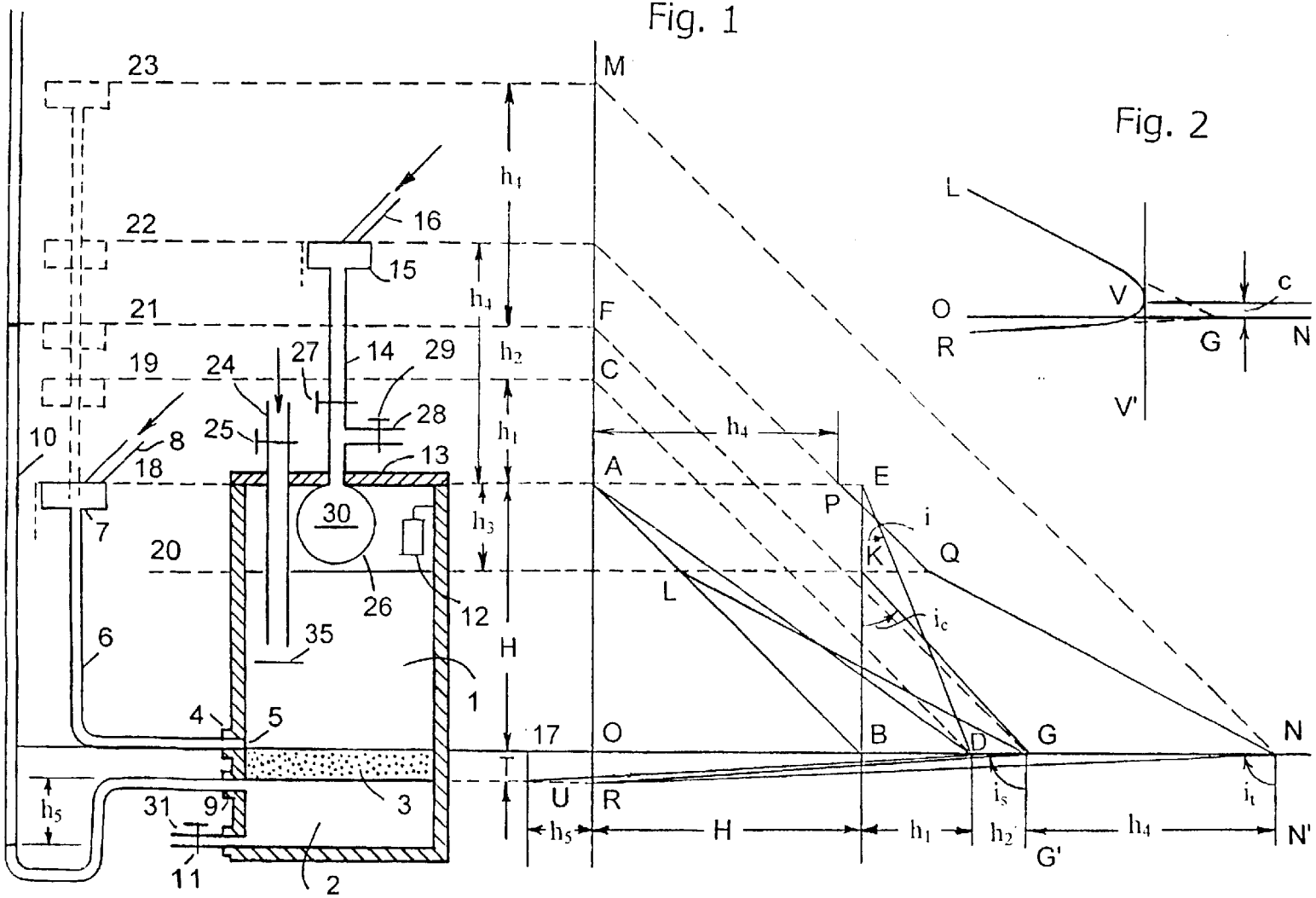
FIG. 2 shows a small area at the upper surface of the permeable member where active processes of settling of solid particles take place.

The invention is based on discovery of the suspension force. This force forms the basic element of suspension mechanics. The following text describes the operation of the present apparatus with an aqueous suspension. However any other liquid may be the fluid constituent of the suspension.

1. Apparatus

High neutral stresses develop in suspensions. The apparatus shown in FIG. 1 demonstrates this fact. The apparatus consists of a container 1 and a chamber 2 separated by a permeable member 3, located at a lower area of the container. At the bottom of the container 1 is an upper flange 4 with a rubber membrane 5. A tube 6 with mobile vessel 7 is connected to the upper flange 4. Water level in the vessel 7 is maintained at elevation of the upper rim by use of a water supply 8. At the top of the chamber 2 is a lower flange 9. A piezometer 10 is connected with the lower flange 9. At the bottom of the chamber 2 is an outlet 31 with a valve 11. A vibrator 12 is installed in the container 1.

The permeable member 3 is not used for filtration since that does not occur in thick suspensions. Its purpose is creating the seepage force in container 1.

The membrane 5 prevents penetration of substance but permits transmission of pressure. If the pressures acting on the membrane 5 from both sides are equal, the membrane 5 is flat. If the pressures acting on sides of the membrane 5 are different, the membrane 5 bulges toward the side where smaller pressure is acting.

Distribution of piezometric heads is shown in the diagram on the right. Solid lines show distribution of heads acting on the membrane 5 from the right that is within the container 1. Dashed lines show the heads acting from the left that is in the tube 6 and the vessel 7. The reference level 17 is the upper surface of the permeable member 3.

2. Open Container With Water

First the case of the open container will be considered (solid section). Disregard therefore the lid 13 (section with inclined hatching) with all facilities mounted on it as shown in FIG. 1. These are a pressure tube 14 with an outlet 28, a suspension supply tube 24, valves 25, 27, 29, and an expanding member 26. Open container is shown separately in FIG. 3.

The container 1, chamber 2, tube 6, and vessel 7, are filled with water up to the rim of container 1 (elevation 18), the permeable member 3 is soaked with water, and the valve 11 is closed. Equilibrium condition requires that the upper rim of the vessel 7 be also at the level 18. Distribution of piezometric heads within the container 1 is shown on the diagram by line AB. The same line shows the distribution of piezometric heads in the vessel 7, and tube 6.

The neutral stress $u_w$ acting on the membrane 5 from the right equals $$u_w=\gamma_w H, \qquad \text{Eq. 1}$$

where $\gamma_w$ is the unit weight of water, and H is the height of the container 1.

The area of the triangle OAB in $m^2$ (FIG. 1) multiplied by the unit weight of water $\gamma_w$ in $t/m^3$ is equal to the total force in tons acting per running meter of the wall of the container 1. If a liquid with another density were used instead of water the inclination of the line AB and the total force acting on the container wall would change correspondingly.

3. Initial State of a Suspension

The water in the container 1 is replaced by a suspension with unit weight $\gamma_m$; the rest remains as it was. The neutral stress acting on the membrane 5 will increase and equal $$u_m=\gamma_m H \qquad \text{Eq. 2}$$

The stress acting from the right side on the membrane 5 will be greater than that acting from the left side. Therefore the membrane 5 will bulge leftward. To make the membrane 5 flat the vessel 7 should be lifted by $h_1$ to elevation 19. The piezometric head in the tube 6 and vessel 7 becomes equal to $H+h_1$. The distribution of piezometric heads in them is shown by line CD. For the sake of simplicity the thickness of the tubes 6 and 10 is neglected as compared with the height of the apparatus.

The equilibrium requires that $$\gamma_m H=\gamma_w(H+h_1) \qquad \text{Eq. 3}$$

The position head at the bottom of the open container 1 (level 17) is zero. The piezometric head measured by means of the vessel 7 is $H+h_1$. Consequently the sum of these heads (the total head) equals to $H+h_1$. The position head at the top of the open container 1 (level 18) is H. The piezometric head at free surface is zero, consequently the total head equals H.

Difference of piezometric levels at the bottom and top of the container 1 is equal to $h_1$. The vertical distance between these levels is equal to H. Consequently the hydraulic gradient will be $$i=h_1/H \qquad \text{Eq. 4}$$

The distribution of piezometric heads in the container 1 is expressed by line AD.

The hydraulic gradient i can be visualized easily. The diagram of OAD of piezometric heads consists of two portions. Portion OAB shows the distribution of the piezometric heads in water. Portion BAD shows the distribution of the piezometric head excess caused by presence of solid particles in suspended state.

The triangle BAD may be replaced by an equivalent right-angled triangle BED. Here BD=$h_1$ is the hydraulic head, and BE=H is the vertical [is] *distance. Their ratio is the tangent of the angle BED or* the hydraulic gradient i; this gradient was caused by neutral stress excess in the suspension.

Relation between the hydraulic gradient i and the unit weight $\gamma_m$ is found combining Eqs. 3 and 4:

$$i=(\gamma_m-\gamma w)/\gamma_w \qquad \text{Eq. 5}$$

Rewriting Eq. 3 with use of Eqs. 1 and 2 we find the neutral stress excess $u_e$ in the suspension in terms of stresses exceeding that in the water:

$$u_e=u_m-u_w \qquad \text{Eq. 6}$$

Solid particles in a suspension experience the static (Archimedean) uplift. The uplift is determined as the weight of the displaced liquid. Hence the static unit weight $\gamma_{st}$ of solid particles in the suspension equals $$\gamma_{st}=\gamma_s-\gamma_m. \qquad \text{Eq. 7}$$

where $\gamma_s$ is the unit weight of solid particles.

Separation of previously homogenous suspensions starts under action of gravity. Solid particles sink under action of the static unit weight $\gamma_{st}$ and increase the density of the mass in lower layers while the water clarifies and collects in the upper layers.

Friction is formed on relative movement of water and soil.

Friction between the moving water and immovable walls of pores in soils is considered in soil mechanics. From this friction arises the drag, which acts on the soil, and causes the volumetric seepage force j. The seepage force acts in direction of water movement. As known the seepage force is proportional to the hydraulic gradient $i_{seep}$ $$j=i_{seep}\gamma_w. \qquad \text{Eq. 8}$$

The hydraulic gradient $i_{seep}$ of seepage force j is found by dividing the hydraulic head, or difference of piezometric levels in upper and lower pools (head- and tailraces) by distance.

Similarly, the friction between sinking solid particles in suspension and immovable water produces a drag that represents a volumetric suspension force J This force is also proportional to the hydraulic gradient $i_{susp}$.

$$J=i_{susp}\gamma_w \qquad \text{Eq. 9}$$

The hydraulic gradient $i_{susp}$ of suspension force J is found by dividing the piezometric head excess by vertical distance.

The suspension force is directed opposite to movement of solid particles. The effect of this force consists in decreasing the static unit weight $\gamma_{st}$ of solid particles. As a result the dynamic unit weight $\gamma_{dy}$ of the solid particles is formed $$\gamma_{dy}=\gamma_{st}-J. \qquad \text{Eq. 10}$$

The dynamic unit weight [ydy] $\gamma_{dy}$ is smaller than the static unit weight $\gamma_{st}$. The magnitude of the decrease is equal to the suspension force J.

4. Final State of a Suspension

Under action of dynamic unit weight $\gamma_{dy}$ the solid particles sink very slowly. The suspension is clarified gradually in upper layers, and is condensed in lower ones. The previously uniform distribution of the suspension density is disturbed.

The dynamic unit weight of the solid particles $\gamma_{dy}$ in upper layers is increased, and that in lower layers is decreased. This process lasts until the suspension is clarified fully in upper layers and supernatant is formed. Consequently unit weight of the mass in these layers becomes equal to the unit weight of water $\gamma_w$. By contrast, the dynamic unit weight of the solid particles in the lower layers decreases gradually, and becomes finally equal to zero.

$$\gamma_{dy}=0. \qquad \text{Eq. 11}$$

The solid particles in such a mass become weightless, and cannot sink any more. The suspension converts into the critical state.

For this to happen the suspension force $J_c$ in the whole mass being in the critical state should be equal to the static unit weight $\gamma_{st}$ of solid particles (Eq. 10).

$$J_c=\gamma_{st}. \qquad \text{Eq. 12}$$

As known the conversion of sand sediments into the critical state is accompanied with increase of neutral stresses and decrease of the effect stresses. That arises from action of a rising seepage flow. Hydraulic head generates the process. This agent acts as an external cause, and the result is the formation of the seepage force j.

Here an opposite process occurs. The suspension is converted into the critical state by condensation of the suspension. The process is generated by difference of unit weights of the suspension $\gamma_m$ and water $\gamma_w$ measured by piezometric levels 19 and 18, correspondingly. This agent acts as an internal cause, and the result is the formation of the suspension force J.

The extremely slow sinking of solid particles ceases when the critical state is attained (Eq. 12).

The critical state of suspensions sets in after many years and decades. Since the critical state corresponds to a complete cessation of settling, the state of suspensions during the extremely slow setting is designated as the subcritical state. During this period clarification of suspension in the upper layers, and its condensation in the lower ones still occurs. The subcritical state is characterized by gradual increase of the unit weight of suspension with depth and time.

Clarification of upper layers leads to subsidence of the interface between the supernatant and the suspension. This interface lowers from level 18 to 20. Condensation of lower layers leads to increase of the pressure exerted on the membrane 5, and it bulges leftward. To make the membrane 5 flat the vessel 7 should be lifted by height $h_2$ to elevation 21.

Distribution of piezometric heads acting on the membrane 5 from the left is shown by line FG. The increase of pressures on the membrane 5 is reflected on the diagram by shift of the point D to position G.

The quantity of substance in the container during settling has not been changed. Therefore the change of distribution of piezometric heads should not affect the total force acting on the container wall. Consequently the triangle BED transforms into the equivalent right-angled triangle BKG. Tangent of the angle BKG is equal to the critical hydraulic gradient $i_c$, $$i_c=h_c/(H-h_3), \qquad \text{Eq. 13}$$

where $h_c$ is the critical head, $h_c=h_1+h_2$, and $h_3$ is the subsidence of the supernatant-suspension interface.

Bringing the apex K of the triangle BKG to the left into alignment with the line AB in the point L, the diagram of piezometric heads ALG acting in the critical state is obtained The system is in equilibrium. The suspension will remain in the critical state for the indeterminate long time.

5. Settling of Solid Particles

The valve 11 is open; the rest remains as it was. The situation changes drastically. The water pours out of the chamber 2, and the piezometric head at the bottom of the permeable member 3 drops to zero. The water from the piezometer 10 pours out.

Distribution of piezometric heads in the permeable member 3 is shown by line GR. Local high hydraulic gradient $i_s$ is formed in the permeable member 3.

$$i_s=(H+h_1+h_2)/T \qquad \text{Eq. 14}$$

where T is the thickness of the permeable member 3 with adhered layer of sediment.

The hydraulic gradient $i_s$ is shown in FIG. 1 as tangent of the angle G'GR. The direction of the hydraulic gradient [is] on the diagram (to the left of the vertical) is opposite to directions of previous hydraulic gradients i and $i_c$ (to the right of the vertical). Therefore not the suspension force but the seepage force is generated.

The thickness T of the permeable member 3 is considerably smaller than the height H of the container 1. Therefore the hydraulic gradient [is] in permeable member 3 will be considerably higher than the critical hydraulic gradient $i_c$. The hydraulic gradient [is] is directed downward, and produces the high seepage force $j_s$ $$j_s=i_s\gamma_w. \qquad \text{Eq. 15}$$

The high seepage force $j_s$ is acting now in lower layers of the mass adjacent to the permeable member 3. Its direction is opposite to that of the suspension force J The seepage force $j_s$ destroys smaller suspension force J, and causes the rapid settling of the suspension.

The sediment becomes the part of the permeable member. The drop of piezometric heads starts not at the upper surface of the permeable member, but at the upper surface of the sediment. For this reason it is advantageous not to remove the full thickness of the deposit that was settled on the permeable member 3 during the processing. It is expedient to keep a thin layer of sediments on the surface of the permeable member 3. Thus the thin active layer will serve also as a protection from plugging up the permeable member 3.

Seepage force is known well. However the application of seepage force for settling the suspensions is a new use of this force. This solution became evident after discovering the nature of the suspension force. The suspension force is an antipode of the seepage force.

Removal of sediment formed is carried out periodically or continuously. In the latter case the permeable member is represented as an endless filtrating conveyor belt installed inclined and rising gradually (FIG. 4).

Use of endless filtrating belts is a well-known technological procedure, particularly in paper industry. However its application for continuous removal of particles settled by seepage force is a new use of filtrating conveyors.

The settling occurs rapidly. During the settling only a small quantity of water percolates actually through the permeable member. That does not affect the process because neither the discharge, nor the velocity of flow, but the magnitude of the hydraulic gradient determines the value of the seepage force j (Ea. 8).

However the actual seepage should occur for developing the seepage force. Some suspensions may be too thick, and no seepage takes place. In such cases the suspensions should be diluted in order to decrease the suspension force and to start the seepage. This procedure shows visually the unusual behavior of suspensions: in order to dehydrate completely a half-dehydrated sludge it is necessary first to dilute this sludge.

The suspension and seepage forces are different but related phenomena: both are formed in liquids as a result of difference of piezometric levels, and both are proportional to the hydraulic gradients.

The difference consists in the direction of these forces in relation to the movement observed. The seepage force acts in porous immovable systems, and is directed along the movement of water. This force caused the dragging effect on walls of pores and carrying away effect on occasional solid particles suspended in water. The suspension force acts in suspensions with immovable water. It is directed opposite to the movement of sinking solid particles found in water, and causes a braking effect on them. Because of related nature and opposite direction, these forces are antagonists, and they do destroy each other. The greater force prevails.

The upper flange 4, rubber membrane 5, tube 6, mobile vessel 7 and water supply 8 are shown in figures to explain the position of piezometric heads in different stages of the process. Likewise the chamber 2, lower flange 9, piezometer 10, valve 11, and exposure to the atmosphere are shown to explain the creation of seepage force after decreasing the pressure acting on the downstream surface of the permeable member 3. These facilities are not required in actual embodiments. Exposure to the atmosphere is one of possible means of creating the seepage force; other means may be also used.

The following steps are actually required as part of the method of the invention:

1. Applying the suspension into the container 1, having a permeable member 3 in the lower area that extends across the entire cross-section of the container, whereby a suspension force is formed.
2. Creating and maintaining the oppositely directed seepage force within the permeable member 3 due to action of the pressure applied to upstream surface of the permeable member. This pressure should be greater than that which acts on the downstream surface. The difference between pressures acting on both surfaces should be high enough to form and to maintain the seepage force able to destroy the suspension force, and to cause settling of solid particles.
3. Removing continuously or periodically the sediment formed.

6. Mechanism of Destruction of Suspension Force

Mechanism of destruction of the suspension force by the seepage force is very peculiar. Direct comparison of magnitudes of the suspension and seepage forces characterized by inclination of lines LG and GR (FIG. 1) would be an inadmissible simplification. The suspension and seepage forces act in different media: the former in suspension filling the container 1, and the latter in water filtrating in pores of the permeable member 3. However because of high porosity of the permeable member no sharp boundary between these media does exist.

FIG. 2 shows a small area in vicinity of the point G (FIG. 1). Lines LG and GR do not form actually an acute angle (shown by dashed lines) but transit smoothly one into the other (shown by a solid line). The point V displays the maximum value of the piezometric head. The interaction between the suspension and seepage forces takes place in the thin boundary active layer with thickness c sandwiched between the point V and the upstream surface of the permeable member 3 (line ON).

The hydraulic gradient i for points lying on the transition curve at point V is equal to the tangent of the angle formed by tangent to the curve of distribution of piezometric heads with the vertical. It was shown above that the suspension force is formed when this angle is directed rightward (as i and $i_c$ in FIG. 1) while the seepage force is formed when this angle is directed leftward (as $i_s$ and $i_t$ in FIG. 1). Therefore the suspension force decreases gradually to zero at point V where the tangent to the transition curve LVR gets vertical. The seepage force is generated below where the tangent to the transition curve passes the vertical VV', and the angle formed with the vertical becomes directed leftward.

Below the point V the seepage force formed is added to the static unit weight $\gamma_{st}$ of solid particles. Here solid particles can settle by gravity. The seepage force increases gradually below the point V and helps in settling of solid particles. The position of the point V where the tangent to the transition curve becomes vertical determines the thickness c of the active layer where settling of solid particles can occur. For effective settling of solid particles it is necessary that the point V to be disposed possibly higher from the surface of the permeable member. Therefore the seepage force should be much greater than the suspension force in order to squeeze up the point V.

Important processes proceed in the thin active layer c. Under the effect of the seepage force the adjacent solid particles of the suspension not only plug up the pores of the permeable member 3 but adhere also to its surface. They convert thus as if an extension of the permeable member 3. Only a portion of solid particles plugs up the pores of the permeable member in the very beginning of the process. The largest amount of solid particles does participate in building up the permeable member 3.

7.Vibrating

On grinding of brittle rocks the solid particles are rigid angular grains. On sinking in suspensions the angular grain touches with the surface of the sediment formed. The point of contact with the sediment is not obligatory under the center of gravity of the grain. Therefore a torque is formed by the weight of the sinking grain on rotation around the point of contact. This torque may be smaller than the bond resistance formed in moment of contact with the sediment. Then the grain will keep its initial position. The structure of the sediment formed will be loose. Therefore simultaneous vibrating of the suspension during settling should be performed. The vibration will destroy the loose structure of the sediment, and make thus the structure dense. To do this the vibrator 12 should be installed. If the particles are flexible the vibration will be less effective.

8. Increasing the Seepage Force

It was pointed out above that the deposit settled on the permeable member becomes like an extension of this member. The drop of piezometric heads begins on the surface of the deposit. As the thickness of the deposit settled increases, the hydraulic gradient $i_s$ will decrease. Correspondingly the rate of settling will decrease also. At some thickness of the deposit the rate of settling may become too low. Then the settling will be practically stopped. Therefore it is advantageous to remove periodically or continuously the deposit formed.

It is possible also that in particular cases the seepage force from the very beginning of the process will turn out to be insufficient to destroy the suspension force.

There is an effective means for increasing the seepage force as much as necessary. To accomplish this the apparatus is converted into a closed one. The lid 13 with all facilities installed on the lid closes the container 1. They are the immovable vessel 15 connected by a tube 14, with an outlet 28 and valve 29. Water supply 16 keeps up the water level at the rim of the vessel 15 (elevation 22). Outlet 28 with valve 29 serves for withdrawal of supernatant from the container 1. Another tube 24 with valve 25 secures the suspension supply as in FIG. 1. The water level in the vessel 15 is higher than the rim of the container 1 by $h_4$. Disregard the expanding member 26. Closed container is shown separately in FIG. 5.

The difference between elevations 18 and 22 is equal to $h_4$. As a result the piezometric heads in all points within the container 1 will increase by $h_4$. Membrane 5 experiences additional pressure. To keep it flat, the vessel 7 should be lifted from the level 21 to the level 23 by the same height $h_4$. Distribution of piezometric heads in tube 6 and vessel 7 is expressed by line MN.

The line PQN in FIG. 1 shows distribution of piezometric heads in the closed container at the critical state. The line PQN expressing the distribution of piezometric heads in closed container corresponds to the line ALG for the open container. The line PQN is displaced to the right by weight of $h_4$ high water column for the closed container.

The distribution of piezometric heads in the permeable member 3 in this case is shown by line NR. The drop of piezometric heads in the permeable member 3 increases also by the same amount $h_4$. As a result the hydraulic gradient i, causing the seepage force increases correspondingly. The value of this gradient will be $$i_s=(H+h_1+h_2+h_4)/T. \qquad \text{Eq. 16}$$

The hydraulic gradient [it] $i_t$ is equal to the tangent of the angle N'NR. The increased seepage force $j_t$ in the closed container can reach much higher value than the force $j_s$ in the open container (cf. Eq 14)

$$j_t=i_{s\gamma m}. \qquad \text{Eq. 17}$$

9. Vacuuming

Open-container type settling structures are simpler in mechanical respect than closed-container type ones, and are preferable therefore. Their limitation consists in smaller range of piezometric head difference acting on the upstream and downstream surfaces of the permeable member available, and thus the smaller seepage force. Vacuum may be used for increasing this difference; application of low vacuum may be sufficient. Pumping out the water by a conventional exhaust pump 40 through tube 31 may create the vacuum in chamber 2 (FIG. 3). The vacuum causes a lowering of the piezometric head in the chamber 2. Designating this lowering expressed in terms of the water column height as $h_5$ we can determine the value of hydraulic gradient $i_\upsilon$. Value $h_5$ is reckoned from the downstream surface of the permeable member 3 (FIG. 1).

The drop of piezometric heads in the permeable member 3 increases by the same amount $h_5$ (FIG. 1). The distribution of piezometric heads in the permeable member 3 in this case is shown by line GU instead of line GR without vacuuming. As a result the hydraulic gradient $i_\upsilon$causing the seepage force increases correspondingly. The value of the hydraulic gradient $i_\upsilon$will be $$i_\upsilon=(H+h_1+h_2+h_5)/T. \qquad \text{Eq. 18}$$

The hydraulic gradient $i_\upsilon$will be equal to the tangent of the angle G'GU (FIG. 1). The seepage force $j_\upsilon$will be $$J_\upsilon=i_\upsilon\gamma_w. \qquad \text{Eq. 19}$$

10. Purification

The closed containers can be used also when the liquid constituent of the suspension is a valuable product, and should be obtained in a pure state. This is the case in some chemical and food technologies. The method described below is also appropriate for purification of oils with impurities.

Figure 6:
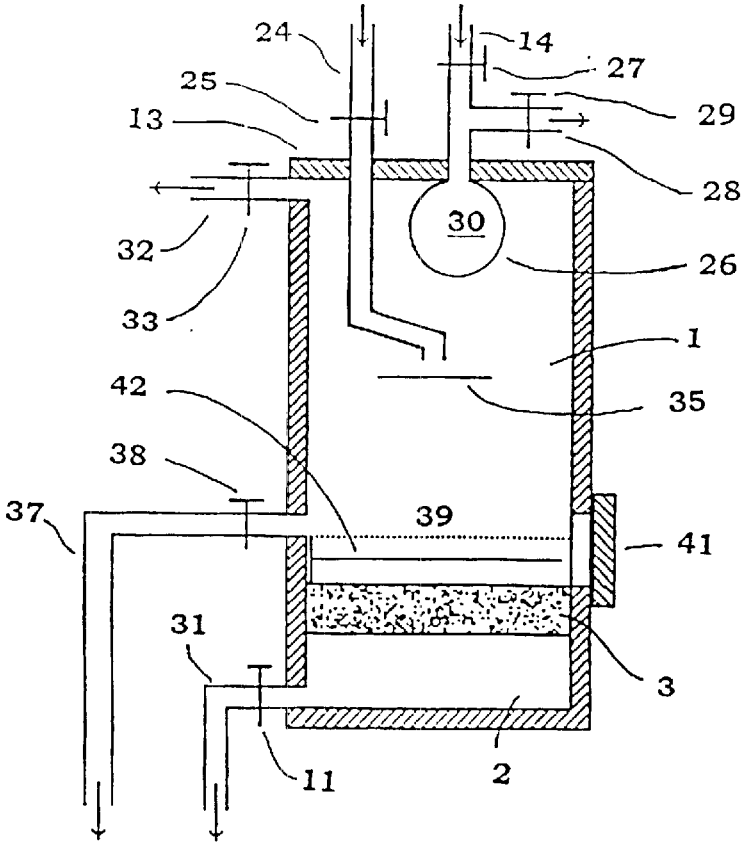
FIG. 6 shows purification of liquids with impurities in a closed container to be used when high seepage force is required; high hydrostatic pressure is added.

The direct contact with the water from the vessel 15 as it was described in paragraph 8 "Increasing the seepage force" is inadmissible. A watertight flexible expanding member 26 is fixed to the lid 13 at the outlet of the tube 14 (FIG. 6). This expanding member 26 provides an isolated space 30 within the container 1. The water from the vessel 15 is received into the expanding member 26. It exerts the supplementary pressure on the suspension in container 1 without any direct contact between this liquid and water. A tube 32 with valve 33 serves for withdrawal of the purified liquid from the container 1.

When the expanding member 26 becomes overfilled with water it is necessary to discharge it. The valve 27 is closed, and the valve 29 is opened. The new portion of suspension entering from the tube 24 squeezes out the water from the expanding member 26 through the outlet 28.

11. Embodiments and Processing

The invention comprises the basic method consisting in application of the seepage force for settling of suspensions or purification of liquids. There are also several supplementary methods as vibrating, diluting, leaving the protecting layer of sediment on the permeable member, increasing the hydrostatic pressure, vacuuming, and isolating the liquid in the closed container from direct contact with water. Combining the basic method with the others, it is possible to find the correct procedure for settling of different types, compositions and states of particular suspensions, and purifying the liquids.

Depending on physical properties of suspensions a number of types of embodiments of the present invention may be implemented, and working regime predetermined based on laboratory and/or pilot experiments. Only principal schemes but not engineering design of different embodiments are shown below. For the sake of clarity and brevity the container 1 will be called as "open container" and the container 1 with the lid 13 as "closed container" (FIG. 1).

One of possible embodiments of the invention represents an open container with permeable member 3 in lower area thereof (FIG. 3). The suspension is supplied into the middle area of the open container through a feeding tube 24 with valve 25. A flap 35 is used to avoid formation of a downward directed jet. The clarification of the suspension occurs, and supernatant is formed in the upper area of the open container. The supernatant is pushed out by new portions of the suspension, removed continuously at the open container rim through overflow channel 36, and directed for recycling. Discharging outlet 37 with valve 38 is disposed at the middle part of the open container at a certain height above permeable member 3 (level 39, shown by a dotted line). This height is determined by the magnitude of the desirable thickness of sediments formed before their removal. Vibrator 12 may be installed within open container if vibration of the sediment during settling is needed. The outlet 31 with valve 11 attached to the chamber 2 connects it with the exhaust pump 40 securing low vacuum in chamber 2 and outflow of filtrate for recycling.

The removal of the sediment is performed periodically. The process consists of two steps:

1. Removing the suspension from open container. When the surface of the sediment settled on permeable member 3 reaches the level 39 , valve 25 of feeding tube 24 is closed, valve 38 of discharging outlet 37 is opened; suspension from the open container is emptied and directed to the tank where tailings are collected after benefaction (not shown in FIG. 3). When this operation is finished valve 38 is closed.
2. Removing the sediment. The cover 41 of the hatch is opened and the sediment formed on permeable member 3 is removed by mobile scraper with handle 42, leaving a thin protective layer of sediment on the permeable member 3. Then scraper 42 is installed into place, cover 41 of the hatch is closed, and valve 25 of the feeding tube 24 opened. Process of settling is resumed.

Water removed from container 1 (supernatant) and chamber 2 (filtrate) is not pure; it contains dissolved chemical reagents used in benefaction of ores and some suspended solid particles. This water should be used as recycled (circulating) water in concentration mills. That reduces considerably the demand for fresh water and chemical reagents.

The first embodiment is appropriate for suspensions that need an intermediate seepage force for destroying the suspension force.

The second possible embodiment of the invention represents an open container where an inclined conveyor 43 wit filtrating belt 44 serves as permeable member 3 (FIG. 4). The idler conveyor pulley 45 is disposed at depth at one end of the container; the driving conveyor pulley 46 is disposed above the container rim at the opposite end. The conveyor belt is rising gradually. The belt is supported by a series of rollers 47. A continuous flexible watertight apron 48 is fastened at face and two longitudinal walls of the container parallel to conveyor belt. The cross-section of the apron designated by 48 is shown at end wall of the container, and the front view designated by 48'—at the longitudinal wall. The apron 48 is placed on the face and sides of the conveyor belt 44 in order to eliminate the passage of suspension by-pass the conveyor belt. The sediment is scraped out by an immovable scraper 49 installed above the container rim. The suspension is supplied continuously through feeding tube 24 with valve 25 and flap 35. The supernatant is removed continuously at the container rim through a perimetric overflow channel 36 and directed for recycling. The filtrate is collected on the bottom of chamber 2 and removed continuously through outlet 31 with valve 11 by gravity or by pressure pump 50 for recycling.

The second embodiment is appropriate for suspensions needing a low seepage force for destroying the suspension force and has high productivity.

Figure 5:
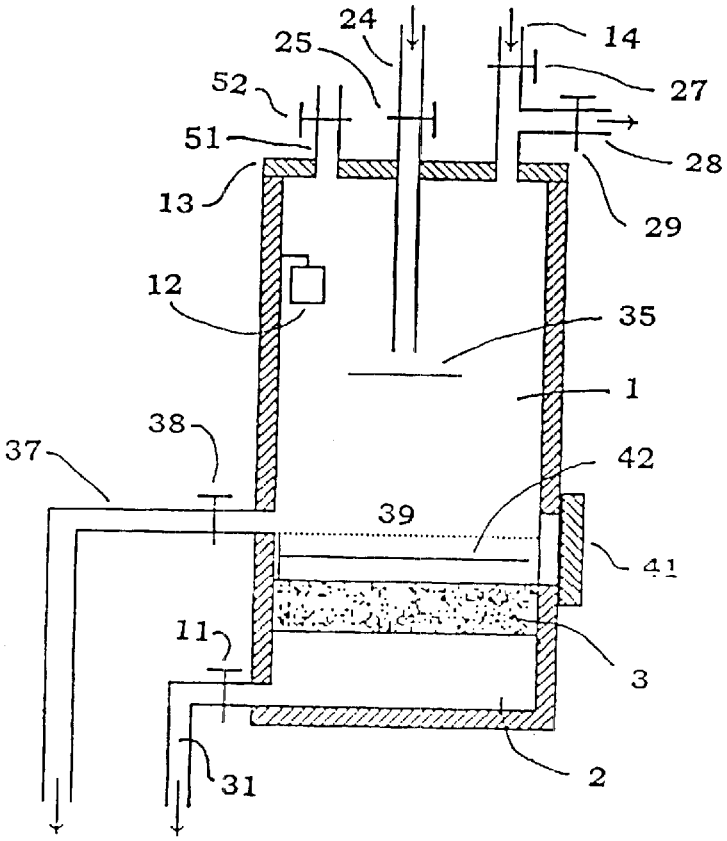
FIG. 5 shows settling of suspension in a closed container to be used when high seepage force is required; high hydrostatic pressure is added.

The third possible embodiment represents a closed container (FIG. 5). Three tubes are installed on lid 13: feeding tube 24 with valve 25 and flap 35, pressure tube 14 with outlet 28 and valves 27 and 29, and a short standpipe 51 with valve 52. The suspension is supplied through feeding tube 24. Flap 35 serves for eliminating the vertical jet in the suspension. High hydrostatic pressure is transmitted through tube 14 connected with a conventional pressure tank (not shown in FIG. 5). Outlet 28 with valve 29 serves for removal of supernatant for recycling. Short standpipe 51 with valve 52 serves for communication with atmosphere. A discharging outlet 37 with valve 38 is disposed at the middle part of closed container at a certain height above permeable member 3 (level 39, shown by a dotted line) as that in the first embodiment. Vibrator 12 is installed if necessary within the closed container. Outlet 31 with valve 11 serves for removal of filtrate from chamber 2 for recycling; valve 11 is normally open.

Operations are performed periodically and consist of four steps;

1. Supplying the suspension into the empty tank. The closed container is filled with suspension through feeding tube 24. Valves 25 and 52 are opened, and valves 27 and 29 are closed. The suspension entering through tube 24 pushes out air through standpipe 51 and fills up the closed container.
2. Settling solid particles. When the suspension appears from standpipe 51 valves 25 and 52 are closed, and valve 27 is opened. The hydrostatic pressure in the closed container increases, and high seepage force develops. The settling of solid particles occurs, supernatant is formed, and a part of water filtrates through permeable member 3. This filtrate is removed through the outlet 31 by gravity or by means of a conventional pressure pump (not shown in FIG. 5) and directed for recycling.
3. Emptying closed container. When the surface of sediment formed reaches the level 39, the sediment should be removed. Valves 25 and 27 are closed, valve 52 is opened and closed container communicates with atmosphere through standpipe 51. Valve 38 is opened and the suspension is removed from closed container and directed by gravity or by means of a conventional pressure pump (not shown in FIG. 5) into the tank collecting tailings after benefaction, as in the first embodiment. The space in closed container is replaced by air entering through standpipe 51. When this operation is finished valve 38 is closed.
4. Removing the sediment formed. When the suspension is evacuated from closed container, the sediments formed should be removed. Cover 41 of hatch is opened, and mobile scraper with handle 42 removes sediments leaving a thin protective layer of sediment as in the first embodiment. After removing the sediment the cover 41 of hatch is closed. Then the cycle is repeated.

The third embodiment is appropriate for suspensions needing high seepage force for destroying the suspension force.

The fourth possible embodiment represents a purifying closed container (FIG. 6). Three tubes are installed on lid 13: a short standpipe 51 with valve 52; feeding tube 24 with valve 25 and flap 35; and pressure tube 14 leading to a watertight, flexible expanding member 26 with outlet 28, and valves 27 and 29. Short standpipe 51 with valve 52 serves for communication with atmosphere. The impure liquid is supplied through feeding tube 24. Flap 35 serves for eliminating the vertical jet in the liquid. Pressure tube 14 is connected with a conventional pressure tank (not shown in FIG. 6). High hydrostatic pressure is developed in watertight flexible expanding member 26 on opening of valve 27. Discharging outlet 28 with valve 29 attached to pressure tube 14 serves for removal of water from expanding member 26. Two similar discharging outlets with valves are attached to closed container. Discharging outlet 32 with valve 33 in the upper area of closed container serves for removal of purified liquid. Discharging outlet 37 with valve 38 is disposed in the lower area of closed container at a certain height above permeable member 3 (level 39), and serves for discharging the suspension before removal of the impurities as described in the first embodiment. The removed suspension is returned into the tank with impure liquid for processing thereafter.

Operations are performed periodically and consist of four steps:

1. Supplying the impure liquid into the empty closed container. The closed container is filled with impure liquid through feeding tube 24. Valves 25 and 52 are opened, and valves 27 and 29 are closed. The impure liquid entering through tube 24 pushes out the air through standpipe 51 and fills up the closed container.
2. Settling solid particles. When the impure liquid appears from standpipe 51 valves 25 and 52 are closed, and valve 27 is opened. The hydrostatic pressure in closed container increases, and high seepage force develops. The settling of impurities occurs, the liquid is purified, and a part of liquid filtrates through permeable member The purified liquid is removed through outlet 32 with valve 33 located in the upper area of the container and directed to collector of purified liquid (not shown in FIG. 6). The filtrate is removed through the outlet 31 and directed to the same collector of purified liquid.
3. Emptying closed container. When the surface of sediment formed on the permeable member 3 reaches the level 39 the sediment should be removed. Valves 25 and 27 are closed, valve 52 is opened and closed container communicates with atmosphere through standpipe 51. Valve 38 is opened and the unpurified fully liquid is removed through outlet 37. Since this liquid contains impurities it should be processed again. Therefore this portion of liquid is directed to collector of impure liquid (not shown in FIG. 6). The space in closed container is replaced by air entering through standpipe 51.
4. Removing the sediment formed. When the unpurified liquid is evacuated from closed container, the sediment formed on the permeable member 3 should be removed. Cover of hatch 41 is opened and mobile scraper 42 removes sediment leaving a thin protective layer of sediment on the permeable member 3. After removing the sediments the cover 41 of the hatch is closed. Then the cycle is repeated.

Since concentration of impurities in liquids is usually not high, several alternations of the first and second steps may be required until the layer of sediments on permeable member 3 will reach the level 39.

This version is appropriate for purifying the liquids from undesirable impurities.

Another embodiments are also possible. They should be designed depending on physical properties of particular suspensions. All possible embodiments are based the same principle that represents the essence of the invention, viz. creation of the seepage force directed opposite to the direction of the suspension force, and high enough to destroy the suspension force.

12. Distinguishing Features of Invention

The following features distinguish the present invention of settling solid particles in form of hard sediment from the other known methods.

The present method distinguishes materially from method of adding a suspension to a container and allowing the solid particles to settle by gravitational force. As known such settling of thick suspensions does not occur completely. A jelly-like or viscous body is formed that will not settle anymore, and should be stored in tailings ponds for indefinite long time. The reason of this phenomenon was unknown hitherto. The true reason became clear after discovering the suspension force: the action of the suspension force that develops in suspensions along with the increase of their density, and makes the solid particles weightless. The application of oppositely directed seepage force destroys the suspension force and causes formation of hard sediments.

The difference between settling of suspended solid particles carried out in the present invention and well-known filtration of suspensions consists in the following. Filtration is passage of a liquid through a porous medium. Seepage force is developed due to friction between mobile liquid and walls of the unmovable porous medium. This force is directed along the flow lines of the mobile liquid. Suspending is holding of solid particles in a liquid without attachment. Suspension force is developed in suspensions due to the friction between surfaces of sinking solid particles and unmovable liquid. This force is directed opposite to movement of sinking particles.

The invented method of settling solid particles in suspensions distinguishes essentially from the filtration. The filtration requires a complete passage of liquid through the permeable member. Solid particles are left on the upper surface of the permeable member. Such a process can be carried out in thin suspensions only. The invented method requires only a partial passage of liquid through the permeable member in order to initiate and maintain the seepage force. The seepage force destroys the oppositely directed suspension force, and the solid particles can settle freely in the liquid. The greater part of liquid remains above the permeable member. The dehydration is performed not by removing the water during filtration but by settling of solid particles under water on the bottom of the vessel forming hard sediment.

While the invention has been described in terms of piezometric heads and hydraulic gradients, those skilled in the art will recognize that the invention can be embodied and practiced within the spirit and scope of the appended claims.

I claim:

1. A method for settling of a suspension of solid particles [of mining tailings] in a carrying liquid with use of a seepage force and obtaining a dehydrated sediment without drying or adding chemicals to said suspension performed in a settling structure comprising steps of:

a) adding said suspension to an upper area of said settling structure, wherein said settling structure comprises a container and a permeable member extending across the entire working cross-section of said container at a lower area thereof, whereby an upward directed suspension force acting of said solid particles in said suspension is formed;

b) creating and maintaining said seepage force directed oppositely to said suspension force, said seepage force being formed due to difference between piezometric heads acting on upstream and downstream surfaces of said permeable member, high enough to cause said settling of solid particles, whereby said suspension force is destroyed, and said dehydrated sediment is obtained;

c) removing said dehydrated sediment formed.

2. A method according to claim 1, further including vibrating of said suspension, whereby the loose structure of said sediment formed is destroyed, angular grains acquire stable position, and structure of said sediment becomes dense and handily for further utilization.

3. A method according to claim 1, further including dilution of said suspension before processing, whereby concentration of said suspension decreases causing decrease of said suspension force, thereafter an initial seepage is started, said seepage force is generated automatically, and said settling of solid particles is performed.

4. A method according to claim 1, further including periodical removing of said sediment whereby a decreasing of hydraulic gradient in said permeable member with said sediment caused due to increase of thickness of said sediment is eliminated making said settling effective comprising the steps of:

a) ceasing said addition of said suspension into said container;

b) removing said suspension from said container;

c) scraping off said sediment from upstream surface of said permeable member.

5. A method according to claim 1, further including continuous removal of said sediment from said settling structure wherein said permeable member is a transporting permeable means installed inclined across the entire working cross-section of said container such that said solid particles are settled on upstream surface of said permeable means and carried out during movement of said transporting permeable means whereby said removal of said sediments occurs continuously with required velocity.

6. A method according to claim 1, further including keeping above said permeable member a layer of said sediment thick enough to protect said permeable member from plugging up and performing said settling, whereby service time of said permeable member is prolonged.

7. A method according to claim 1, further including supplying said suspension into a closed settling structure, applying into said closed settling structure a supplementary hydrostatic pressure high enough to initiate and maintain said seepage force and performing said settling, whereby said seepage force is increased, making said settling effective.

8. A method according to claim 1, further including applying a vacuum to space under downstream surface of said permeable member, whereby said seepage force is increased, making said settling effective.

9. A method according to claim 1, further including supplying said closed settling structure with a watertight, flexible expanding member, forming an isolated space within said closed settling structure, supplying a liquid with impurities into said closed settling structure, applying said supplementary hydrostatic pressure into said isolated space, creating said seepage force in said liquid with impurities, performing said settling of said impurities, and obtaining a purified liquid.

* * * * *